(12) United States Patent
Guo et al.

(10) Patent No.: US 11,467,874 B2
(45) Date of Patent: *Oct. 11, 2022

(54) SYSTEM AND METHOD FOR RESOURCE MANAGEMENT

(71) Applicant: Huawei Cloud Computing Technologies Co., Ltd., Guizhou (CN)

(72) Inventors: Lei Guo, Markham (CA); Chong Chen, Richmond Hill (CA); Jason Lam, Markham (CA)

(73) Assignee: Huawei Cloud Computing Technologies Co., Ltd., Guizhou (CN)

(*) Notice: Subject to any disclaimer, the term of this patent is extended or adjusted under 35 U.S.C. 154(b) by 57 days.

This patent is subject to a terminal disclaimer.

(21) Appl. No.: 16/598,412

(22) Filed: Oct. 10, 2019

(65) Prior Publication Data

US 2020/0042356 A1 Feb. 6, 2020

Related U.S. Application Data

(63) Continuation of application No. 14/953,150, filed on Nov. 27, 2015, now Pat. No. 10,452,442.

(51) Int. Cl.
*G06F 9/46* (2006.01)
*G06F 9/50* (2006.01)
*G06F 9/48* (2006.01)

(52) U.S. Cl.
CPC .......... *G06F 9/5011* (2013.01); *G06F 9/4881* (2013.01); *G06F 9/5027* (2013.01)

(58) Field of Classification Search
CPC .................................................. G06F 9/5011

USPC ........................................................ 718/104
See application file for complete search history.

(56) References Cited

U.S. PATENT DOCUMENTS 6,259,448 B1 * 7/2001 McNally ............... G06F 3/0486
  709/201
6,829,765 B1   12/2004 Chan et al.
7,457,824 B1   11/2008 Strom et al.
(Continued)

FOREIGN PATENT DOCUMENTS

CN    101576883 A    11/2009
CN    101996094 A    3/2011
(Continued)

OTHER PUBLICATIONS

Bin, C., et al., "Survey on Software Scalability of Distributed Systems", Computer Science, vol. 38, No. 8, Aug. 2011, 10 Pages.
(Continued)

*Primary Examiner* — Mehran Kamran
(74) *Attorney, Agent, or Firm* — Slater Matsil, LLP

(57) ABSTRACT

Methods and systems of managing a resource in a distributed resource management system can include: receiving a resource request by at least one processor in the distributed resource management system, the resource request identifying a requested resource type corresponding to at least one of: a class identifier identifying a resource class assigned to a composite resource, and a class identifier identifying at least one additional resource associated with the composite resource; determining availability of the requested resource type; and scheduling a workload associated with the resource request for execution based on the determination.

21 Claims, 10 Drawing Sheets

(56) References Cited

U.S. PATENT DOCUMENTS

| | | | |
|---|---|---|---|
| 7,487,239 B2* | 2/2009 | Childress | G06F 11/3495 709/224 |
| 8,060,883 B1* | 11/2011 | Rao | G06F 9/5077 718/104 |
| 8,695,079 B1* | 4/2014 | Miller | H04L 63/08 726/10 |
| 8,862,738 B2* | 10/2014 | Madduri | G06F 9/5083 709/226 |
| 8,914,517 B1 | 12/2014 | Shpilyuck et al. | |
| 9,253,253 B1* | 2/2016 | Bhattacharyya | G06F 9/5027 |
| 9,379,995 B2* | 6/2016 | Shankari | H04L 41/0896 |
| 2001/0033646 A1* | 10/2001 | Porter | H04Q 3/66 379/243 |
| 2002/0052948 A1* | 5/2002 | Baudu | G06Q 30/02 709/224 |
| 2003/0105993 A1* | 6/2003 | Colrain | G06F 9/5061 714/39 |
| 2004/0243660 A1* | 12/2004 | Chew | G06F 9/5061 709/200 |
| 2005/0033846 A1* | 2/2005 | Sankaranarayan | G06F 9/50 709/226 |
| 2005/0198244 A1* | 9/2005 | Eilam | G06F 9/5061 709/223 |
| 2005/0198640 A1 | 9/2005 | Uthe | |
| 2005/0223299 A1* | 10/2005 | Childress | G06F 11/3495 714/47.1 |
| 2006/0242647 A1* | 10/2006 | Kimbrel | G06F 9/5066 718/104 |
| 2006/0294524 A1* | 12/2006 | Vega | G06F 9/45558 718/104 |
| 2007/0011179 A1* | 1/2007 | Paval | G06F 16/83 |
| 2008/0134286 A1* | 6/2008 | Amdur | H04L 63/20 726/1 |
| 2008/0189290 A1* | 8/2008 | Kim | G06F 16/248 |
| 2008/0201762 A1* | 8/2008 | Rits | G06F 9/4862 726/1 |
| 2008/0263625 A1* | 10/2008 | Gomez | G06F 21/6218 726/1 |
| 2009/0089780 A1* | 4/2009 | Johnson | G06F 9/5077 718/1 |
| 2009/0222600 A1* | 9/2009 | Lehr | G06F 9/5027 710/39 |
| 2009/0259930 A1* | 10/2009 | Bertram | G06Q 10/06 715/227 |
| 2009/0292577 A1* | 11/2009 | Gao | H04L 47/826 370/252 |
| 2009/0307353 A1* | 12/2009 | Felton | H04L 69/40 709/226 |
| 2010/0100877 A1* | 4/2010 | Greene | G06F 9/45533 718/1 |
| 2010/0161577 A1* | 6/2010 | Morozov | G06F 16/285 707/705 |
| 2010/0332658 A1* | 12/2010 | Elyashev | G06F 9/505 709/226 |
| 2011/0141124 A1* | 6/2011 | Halls | G06F 21/554 345/522 |
| 2011/0231550 A1* | 9/2011 | Murray | G06F 9/5011 709/226 |
| 2012/0054744 A1* | 3/2012 | Singh | G06F 9/45558 718/1 |
| 2012/0198073 A1* | 8/2012 | Srikanth | H04L 67/10 709/226 |
| 2013/0024857 A1* | 1/2013 | Yusupov | G06F 9/5077 718/1 |
| 2013/0057560 A1* | 3/2013 | Chakraborty | G06F 9/455 345/520 |
| 2013/0067464 A1* | 3/2013 | Shah | G06F 9/45558 718/1 |
| 2013/0091089 A1* | 4/2013 | Noureddine | G06F 16/24532 707/602 |
| 2013/0269027 A1* | 10/2013 | Bowman | G06F 21/6218 726/21 |
| 2013/0283339 A1* | 10/2013 | Biswas | G06F 21/604 726/1 |
| 2014/0082201 A1* | 3/2014 | Shankari | H04L 41/5025 709/226 |
| 2014/0082614 A1* | 3/2014 | Klein | G06F 9/5077 718/1 |
| 2014/0137104 A1* | 5/2014 | Nelson | G06F 9/45558 718/1 |
| 2014/0149984 A1* | 5/2014 | Takahashi | G06F 9/4856 718/1 |
| 2014/0173591 A1* | 6/2014 | Lin | G06F 9/45533 718/1 |
| 2014/0189684 A1* | 7/2014 | Zaslavsky | G06F 9/45533 718/1 |
| 2014/0258446 A1* | 9/2014 | Bursell | H04L 67/303 709/217 |
| 2014/0324973 A1* | 10/2014 | Goel | H04L 67/16 709/204 |
| 2015/0163288 A1* | 6/2015 | Maes | H04L 67/42 709/203 |
| 2015/0281339 A1* | 10/2015 | Strassner | H04L 41/0893 709/224 |
| 2016/0019074 A1 | 1/2016 | Nahir et al. | |
| 2016/0050108 A1* | 2/2016 | Baughman | G06F 11/3457 709/220 |
| 2016/0070597 A1* | 3/2016 | Riggin | G06F 9/5077 718/1 |
| 2016/0088023 A1* | 3/2016 | Handa | H04L 67/02 726/1 |
| 2016/0162308 A1* | 6/2016 | Chen | G06F 9/45533 718/1 |
| 2016/0246629 A1* | 8/2016 | Tsirkin | G06F 9/45558 |
| 2016/0292011 A1* | 10/2016 | Colson | G06Q 10/06311 |
| 2016/0342986 A1* | 11/2016 | Thomas | G06Q 20/3823 |
| 2016/0379130 A1* | 12/2016 | Brown | H04L 67/00 706/52 |
| 2017/0024255 A1* | 1/2017 | Cropper | G06F 9/5077 |
| 2017/0078409 A1* | 3/2017 | Yazir | G06F 16/2246 |
| 2017/0093861 A1* | 3/2017 | Kesavan | H04L 41/12 |
| 2017/0116036 A1* | 4/2017 | Bieswanger | G06F 9/5077 |

FOREIGN PATENT DOCUMENTS

| | | |
|---|---|---|
| CN | 102835067 A | 12/2012 |
| CN | 103383655 A | 11/2013 |
| CN | 104335170 A | 2/2015 |
| EP | 1189146 A1 | 3/2002 |

OTHER PUBLICATIONS

Xiu-Chuan, W., et al., "Data Management Policies in Data Grids", Mini-Micro Systems, vol. 25, No. 1, Jan. 2004, 5 Pages.

* cited by examiner

```
{ "resource":
    {"class":"HOST",
    "name":"myserver1",
    "value" : [
        {"resource":
            {"class":"NUMERIC",
            "name":"cpu",
            "value":"20"}
        },
        {"resource":
            {"class":"NUMERIC",
            "name":"mem",
            "value":"8"}
        },
        {"resource":
            {"class":"NUMERIC",
            "name":"disk_capacity",
            "value":"8192"}
        },
        {"resource":
            {"class":"NUMERIC",
            "name":"disk_bandwidth",
            "value":"32"}
        },
        {"resource":
            {"class":"GPU",
            "name":"GPU1",
            "value":[
                {"resource":
                    {"class":"NUMERIC",
                    "name":"mem",
                    "value":"4"}
                },
                {"resource":
                    {"class":"NUMERIC",
                    "name":"core",
                    "value":"1024"}
                }]
            }
        },
        {"resource":
            {"class":"GPU",
            "name":"GPU2",
            "value":[
                {"resource":
                    {"class":"NUMERIC",
                    "name":"mem",
                    "value":"4"}
                },
                {"resource":
                    {"class":"NUMERIC",
                    "name":"core",
                    "value":"1024"}
}}}}}}
```

FIG. 6

SYSTEM AND METHOD FOR RESOURCE MANAGEMENT

CROSS-REFERENCE TO RELATED APPLICATIONS

This application is a continuation of U.S. Non-Provisional patent application Ser. No. 14/953,150, filed on Nov. 27, 2015 and entitled "System and Method for Resource Management," which application is hereby incorporated by reference in its entirety.

TECHNICAL FIELD

This disclosure relates to workload management systems, and more particularly, to systems, devices, methods and computer-readable media for resource management.

BACKGROUND

In computing environments such as cloud computing, servers, or other systems or devices, workload management systems can be used for result management, workload management and scheduling.

Workloads running on the computing environment may consume or compete for resources in the computing environment. Distributed resource managers often have separate schedulers to handle different resource types. However, as resource interactions become more complex, managing these resources can be a challenge.

SUMMARY

In accordance with one aspect, there is provided a method of managing a resource in a distributed resource management system. The method includes: receiving a resource request by at least one processor in the distributed resource management system, the resource request identifying a requested resource type corresponding to at least one of: a class identifier identifying a resource class assigned to a composite resource in the distributed resource management system, and a class identifier identifying at least one additional resource associated with the composite resource; determining availability of the requested resource type; and scheduling a workload associated with the resource request for execution based on the determination.

In accordance with another aspect, there is provided a system including at least one processor for managing resources. The at least one processor is configured for: receiving a resource request by at least one processor the resource request identifying a requested resource type corresponding to at least one of: a class identifier identifying a resource class assigned to a composite resource in the distributed management system, and a class identifier identifying at least one additional resource associated with the composite resource; determining availability of the requested resource type; and scheduling a workload associated with the resource request for execution based on the determination.

In accordance with another aspect, there is provided a non-transitory, computer-readable medium or media having stored thereon computer-readable instructions. When executed by at least one processor, the computer-readable instructions cause the at least one processor to: receive a resource request by at least one processor in the distributed resource management system, the resource request identifying a requested resource type corresponding to at least one of: a class identifier identifying a resource assigned to a composite resource, and a class identifier identifying at least one additional resource associated with the composite resource; determine availability of the requested resource type; and schedule a workload associated with the resource request for execution based on the determination.

Many further features and combinations thereof concerning the present improvements will appear to those skilled in the art following a reading of the instant disclosure.

BRIEF DESCRIPTION OF THE DRAWINGS

FIGS. 5, and 6 are representations of a model for a composite resource;

These drawings depict aspects of example embodiments for illustrative purposes. Variations, alternative configurations, alternative components and modifications may be made to these example embodiments.

DETAILED DESCRIPTION OF ILLUSTRATIVE EMBODIMENTS

Figure 1:
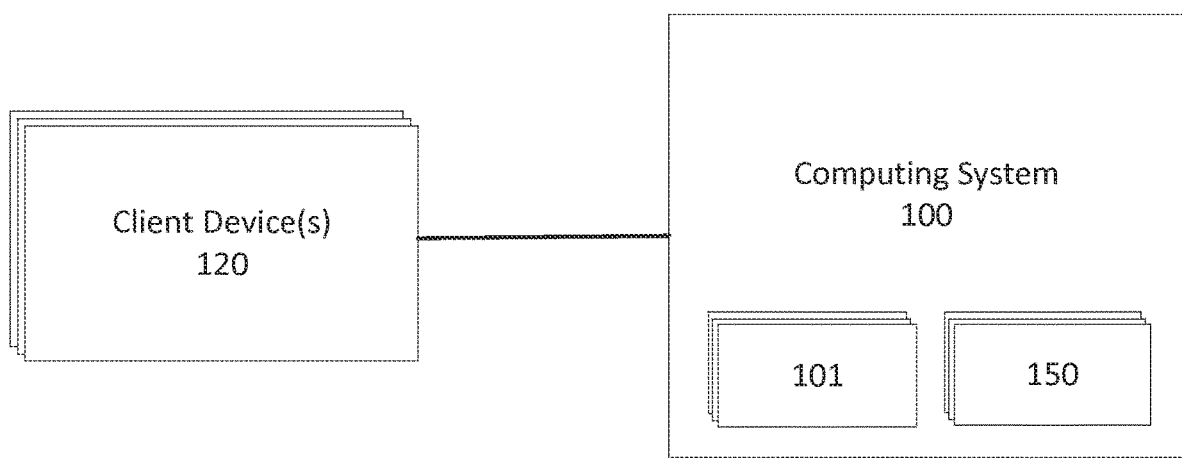
FIG. 1 is a diagram showing aspects of an example computing environment.

FIG. 1 illustrates aspects of an example computing environment 10 to which aspects of the present disclosure can be applied. In the computing environment 10, one or more client devices 120 can connect to a computing system 100 to access or otherwise utilize one or more resources in the computing system 100.

In some embodiments, the computing system 100 can include any combination of hardware and software components. For example, a computing system 100 may include a combination of computing devices, processors, networks, memories, storage devices, network devices, power sources, license servers (e.g., software license servers), swap space, and the like. In some embodiments, the computing system 100 may be a heterogeneous or a homogenous environment, and may have different or similar hardware components running different or similar operating systems.

In some embodiments, the computing system 100 may be a single device physically or logically, such as a single computing device or a single server having one or more resources.

The computing system 100 can include one or more resources 150 which can be shared between, or otherwise utilized by, multiple workloads. Some resources 150 may be physically or logically associated with a single device, and other resources 150 may be shared resources which may be utilized by multiple devices in the system 100.

Irrespective of the number or configuration of devices, networks, hardware, software and/or other resources in the system 100, in some embodiments, the system 100 may be configured to appear as a single image or interface to the client devices 120. The system 100 can be configured to run workloads from the client devices 120 and from components of the system 100 itself.

The computing system 100 may include one or more processors 101 in a single device or split across any number of devices in the system 100. These processors 101 can be configured to manage the resources 150 in the system 100.

The computing system 100 can be configured as a distributed resource management (DRM) system. In some embodiments, the DRM system is an infrastructure middleware which can run on top of a distributed environment. The distributed environment can include different kinds of hardware and software.

The DRM system may be implemented by one or more processors 101 in one or more devices in the system 100. In some embodiments, the DRM system can provide a single system image to client devices 120, and can handle resource management, workload management and scheduling. Workloads can refer to any process, job, service, or any other computing task to be run on the system 100. For example, workloads may include batch jobs (e.g., high performance computing (HPC) batch jobs), Message Passing Interface (MPI) processes, serial and/or parallel batch tasks, real time analytics, elastic applications (e.g., MapReduce), long running services, virtual machines, containers, etc.

Aspects of the present disclosure may be applied to various DRM systems such as the IBM™ Platform Load Sharing Facility (LSF), Apache™ Hadoop, YARN (Yet Another Resource Negotiator), PBS (Portable Batch Scheduler), OpenStack™, Huawei™ FusionSphere, FusionCube and FusionInsight.

Figure 2:
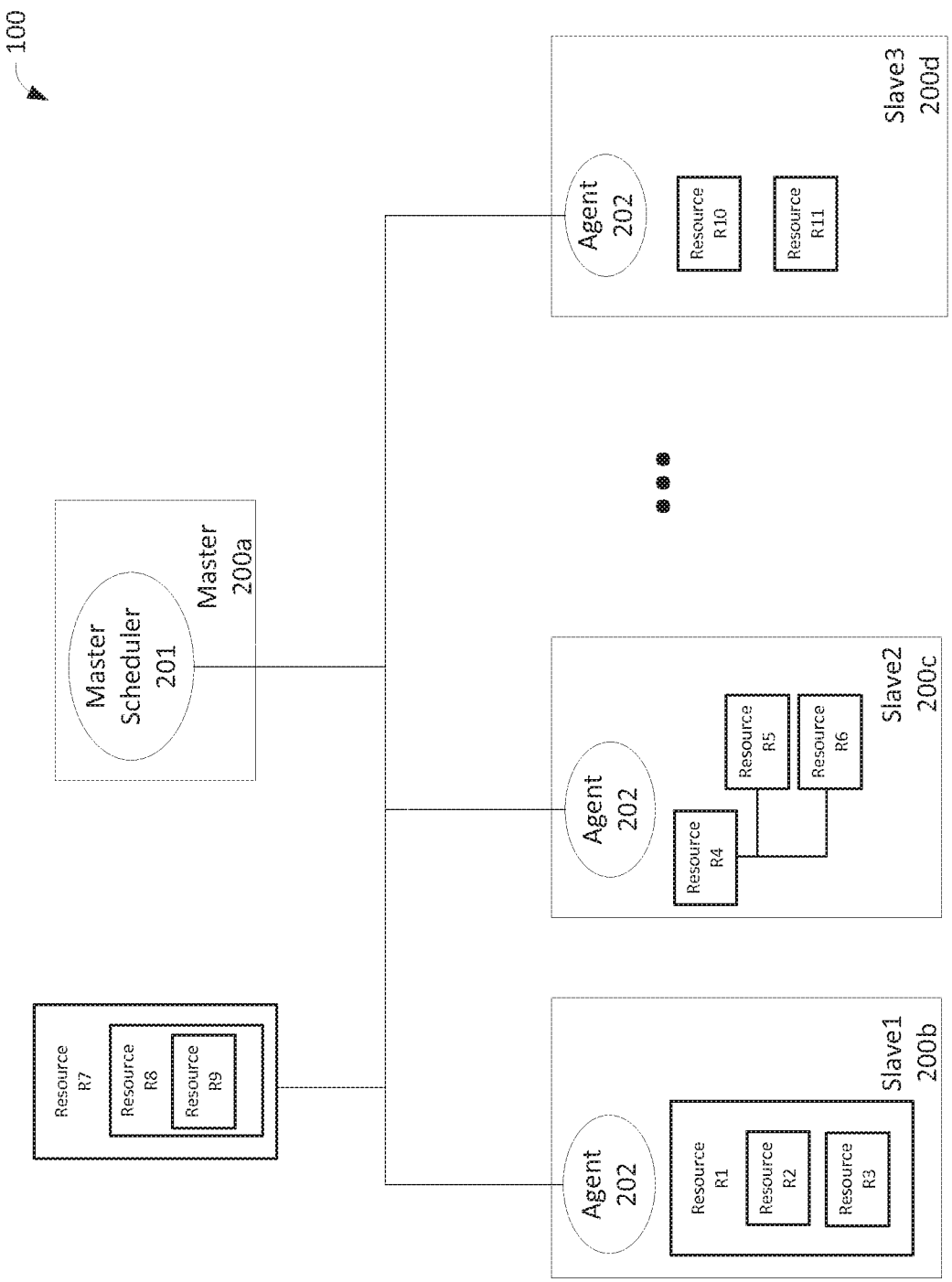
FIG. 2 is a diagram showing aspects of an example system.

FIG. 2 illustrates aspects of an example computing system 100 having multiple computing devices 200 (e.g., servers, computers, network devices). The devices 200 may be connected via any suitable connection including over communication networks. In some examples, the devices 200 may be part of a single unified system, or may be distributed such as in a cloud computing environment.

In some embodiments, the devices 200 may be physically or logically configured as master and slave devices. In other embodiments, other hierarchies or logical arrangements may be used. Any suitable physical and/or logical arrangement of DRM components can be used.

The example system 100 in FIG. 2 has a master machine 200*a* and multiple slave machines 200*b*, 200*c*, 200*d* good. Processors 101 on the master machine 200*a* can be configured to run a master daemon and scheduler. The daemon and scheduler can be responsible for client interaction (e.g., workload submissions, queries, control), workload/resource scheduling and communicating with DRM agents.

Processors 101 on each slave machine 200*b*, 200*c*, 200*d* good can be configured to operate at least one DRM agent. Processors 101 on the slave machines 200*b*, 200*c*, 200*d* good can be configured, via a DRM agent or otherwise, to monitor and report resource availability to the master daemon on the master machine 200*a*. DRM agents can be configured to accept requests from the master daemon to execute and control workloads, and/or to monitor the life cycle of its workloads.

Although aspects of the present disclosure refer to DRM agents, daemons, masters, slaves, etc., it should be understood that DRM components and their functions, interactions, etc., may be performed by one or more processors 101 anywhere in the system 100 in any arrangement, structure, or division of responsibilities. For example, in some embodiments, master or slave may refer to a role or process running on a particular machine or processor. In some examples, master and slave roles can be performed by a single machine. In other examples, the DRM system may operate in a peer-to-peer fashion, as a distributed process, or otherwise.

To increase utilization of the resources 150, the system 100 can be configured for the concurrent operation of workloads on the same machine, and to schedule and/or allocate resources and workloads across the system 100. To manage different resources 150, distributed resource managers can implement separate schedulers for different types of resources 150. For example, the system 100 can have a scheduler for managing central processing units (CPUs), a scheduler for memory, and a scheduler for storage. However, separate schedulers may fail to recognize relationships between different types of resources, and may require custom coding or plug-ins to handle non-standard resource hardware or non-standard resource requests.

For example, a workload requiring a virtual machine may have specific requirements for a number of CPUs, memory, storage, software licenses, network capabilities, etc. Coordinating a single workload requiring different resources 150 across multiple resource schedulers can be a challenge and may require custom code or plug-ins.

In some instances, through separate resource schedulers, different resources 150 for a workload may be spread across multiple devices in the computing system 100, which may result in poor performance or a resource allocation which cannot successfully complete the workload.

In some systems 100, resources 150 can include, be connected to, or be otherwise associated with other resources 150. In FIG. 2, the Slave1 machine 200*b* has a resource R1 which includes two other resources R2 and R3. For example, resource R1 may be a compute server (e.g., host) with a number of computational cores R2 and an amount of memory R3.

The Slave2 machine 200C has a resource R4 which is connected to or associated with resources R5 and R6. For example, resource R4 may be a compute server which is connected to a number of GPUs (graphics processing units) R5 and storage devices R6.

As illustrated by the Slave3 machine good, resources (R10, R11) may not have any defined relationship. Some resources 150 (e.g., R7) may not have a local agent and may be managed by the master scheduler 201 or an agent 202 from another device. For example, in some instances, it may not be possible, practical, or desirable for a networking device to have a local agent.

In some examples, a resource 150 may have related resource capacities or capabilities. For example, if R7 is a networking resource such as a switch, the resource may have associated port resources R8 and bandwidth resources R9 for each of those ports.

These non-limiting examples illustrate some of the many possible resources 150 and their relationships to one another. As resources 150 and workload resource requirements become more complex, so do the modeling, scheduling and monitoring of such resources 150 individually.

In broad terms, some embodiments of the present disclosure may provide a generic or composite resource management system which may be configured to accommodate and manage many types of resources 150 and any associated or related resources 150. For the purposes of the present disclosure, the term "associated" should be understood to include any association or relationship between two or more resources 150.

Figure 3:
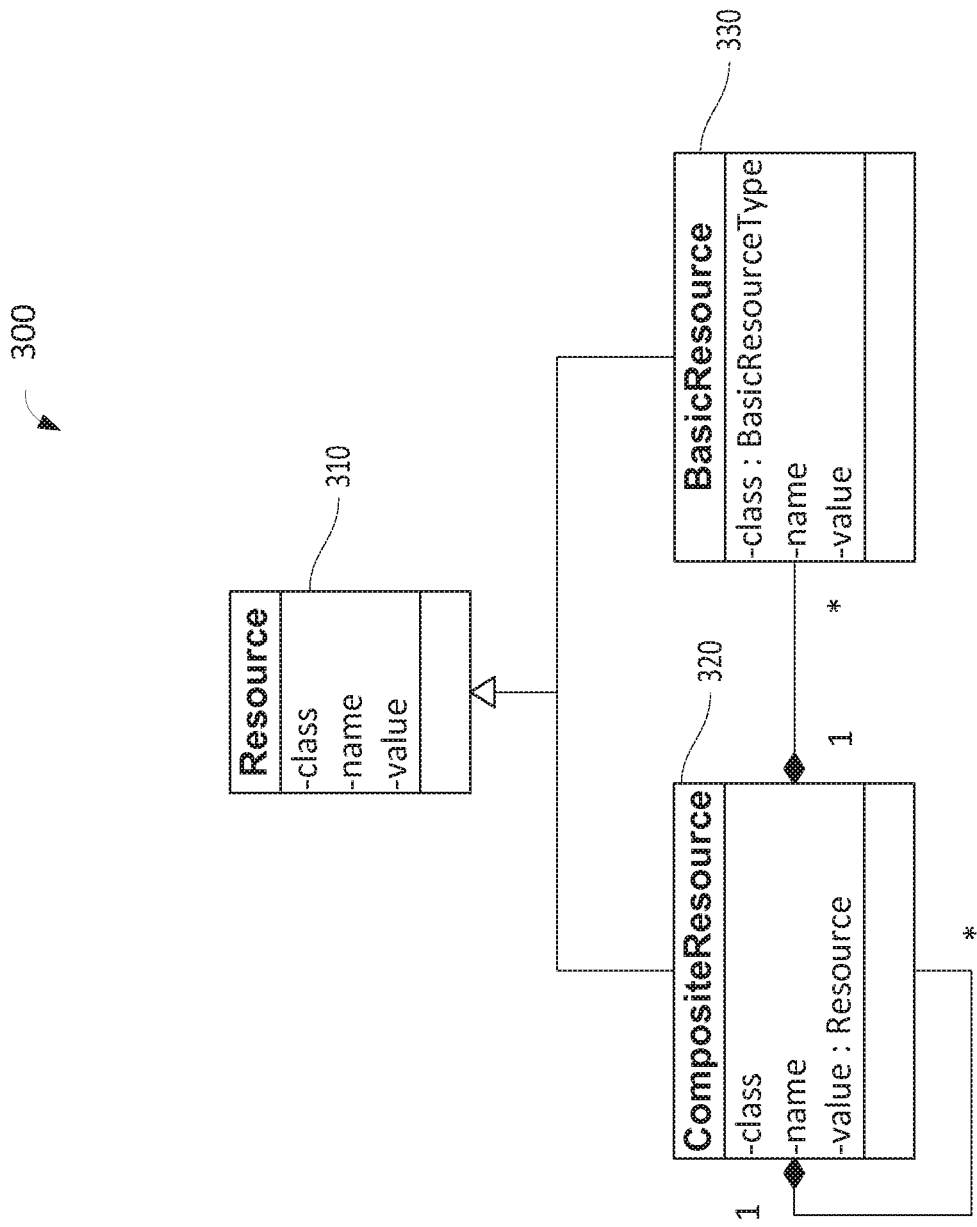
FIG. 3 is a diagram showing example definitions for modelling resources.

FIG. 3 shows an example model 300 which can, in some embodiments, be used to manage resources 150 in a distributed resource management system (DRM). In some embodiments, the model 300 can include a structure or definition for defining a composite resource. As illustrated by the above examples, a composite resource 320 can be any resource 150 which is associated with one or more additional resources 150. As illustrated by the example model 300, the DRM can be configured to manage different types of resources 150. These resources 150 can be basic resources (i.e., resources that have no defined association with another resource iso) or composite resources.

The example model 300 has a resource definition 310 which can include a class identifier, a name identifier and a value identifier. In other embodiments, additional identifiers or definition fields may also be included. In some embodiments, some of the above-listed identifiers or other identifiers/fields may be optional.

A class identifier can identify a class, type, or general nature of the resource 150 being defined. A name identifier can provide a name or otherwise identify the resource 150.

In some instances, the resource instance can be a composite resource 320 or a basic resource 330. A basic resource 330 can include a class identifier for identifying the class or type of resource. Class identifiers can, in some embodiments, include basic resource types such as Boolean, numeric, and string.

A Boolean resource can include any resource which can be defined by a true or false value (e.g., has a value of 1 or 0). A Boolean resource can indicate the availability of specific features or functionality. For example, a Boolean resource can be a file server, a software package, a software version, a special-purpose device, etc. In some examples, a Boolean resource may identify a capability such as "has a Gigabit bandwidth". If the resource is available on the system, the Boolean resource will have a value of true.

A numeric resource can include any resource which has a numeric value. A numeric resource can indicate, for example, a quantity or capacity of the resource. For example, numeric resources can include number of processors, memory size, amount of bandwidth, etc.

A string resource can include any resource which has a string value. A string resource can include, for example, a host type (e.g., LINUX64), a host model (e.g. x86), an operating system (e.g., WINDOWS10), etc.

In some embodiments, resources 150 can be classified as consumable or non-consumable. These or other characteristics can be associated with resources 150 based on class or other identifiers in the resource model. For example, based on a class identifier or other identifiers associated with a resource 150, the DRM may manage the resource 150 as a consumable or non-consumable resource. In some embodiments, numeric and composite resources may be managed as consumable resources; and Boolean and string resources may be managed as non-consumable resources. In some embodiments, only consumable resources may be directly consumed by workloads.

In some embodiments, only consumable resources are continuously monitored by the DRM.

A composite resource 320 can be associated with a class identifier and at least one identifier associated with an additional resource 150. This association can be made in a resource definition as illustrated in FIG. 3, or using any other definition, class, data structure, arrangement, model, or the like for representing the composite resource 320.

In some embodiments, a composite resource 320 can be associated with or otherwise defined as containing or being related to one or more basic resources and/or composite resources 320.

With reference to FIG. 2, in some examples, a composite resource such as resource R1 may be associated with multiple identifiers, each associated with a different resource 150 (e.g., R2, R3). In another example, a composite resource 320 such as resource R7 may be associated with another composite resource (e.g., R8 is another composite resource which is further associated with R9). Any number of levels of associated resources, and any type of relationship, may be defined.

In some examples, a composite resource 320 may include an array, tree or any other flat or hierarchical structure of associated resources.

The table below outlines example suppliers which may be defined as resources 150, as well as associated attributes which may be defined as associated resources.

| Supplier | Sub-level Supplier | Consumable | Non-Consumable | Sub-level resource |
|---|---|---|---|---|
| Switch | | Bandwidth (backbone), VLAN | | Port Uplink |
| Storage Server | | Capacity (block, file, concurrent access, bandwidth, . . . ) | | Disk |
| Compute Server (Host) | | CPU (socket/core/thread), memory, attached storage | HW model | Attached Accelerator, Attached Network, OS |
| | Attached Accelerator | GPU (core, memory), FPGA (area,), Xeon Phi | HW type | |
| | Attached Network | Interface, Bandwidth | HW type | |
| | OS | Port number, socket number | OS Type, version | |
| Application | | License | version | |
| PDU | | Power | | |

Figure 4:
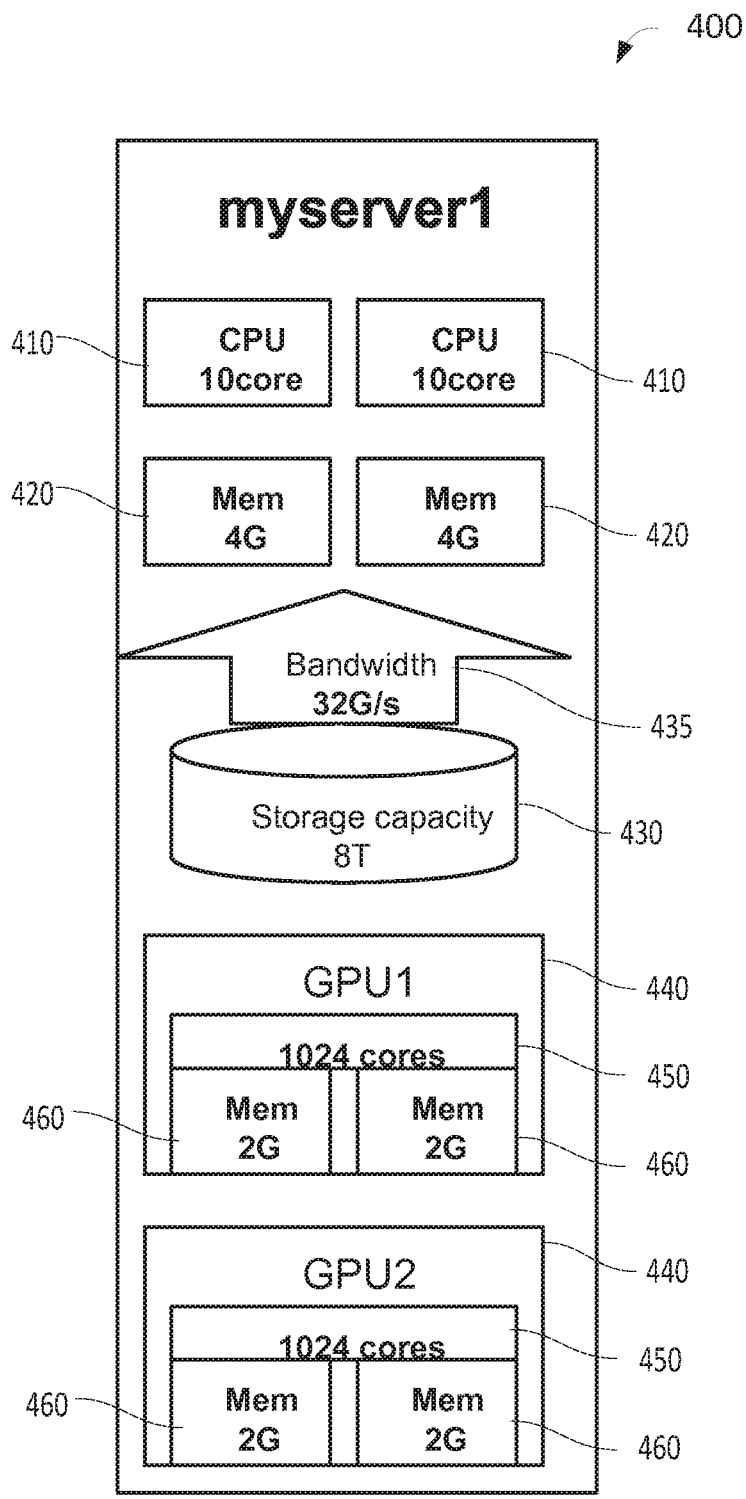
FIG. 4 is a diagram showing aspects of an example composite resource.

FIG. 4 shows a block diagram of an example compute server 400 named "myserver1". The server 400 has two CPU sockets 410. Each CPU 410 has ten cores. The server 400 also has two 4 GB memory modules 420, and an 8 TB storage 430 having a bandwidth of 32 Gb/s 435. The server 400 also has two GPUs 440 named GPU 1 and GPU2, each having 1024 cores 450 and two 2 GB memory modules 460.

In some embodiments, the DRM can be configured to associate the compute server 400 with a composite resource definition. For example, the compute server 400 can be modelled as a composite resource 320 as illustrated by the definition in FIG. 5. The example resource 150 (compute server 400) is associated with a class identifier of "HOST", and a name identifier of "myserver1". The resource 150 is also associated with an array of associated resource identifiers.

Figure 5:
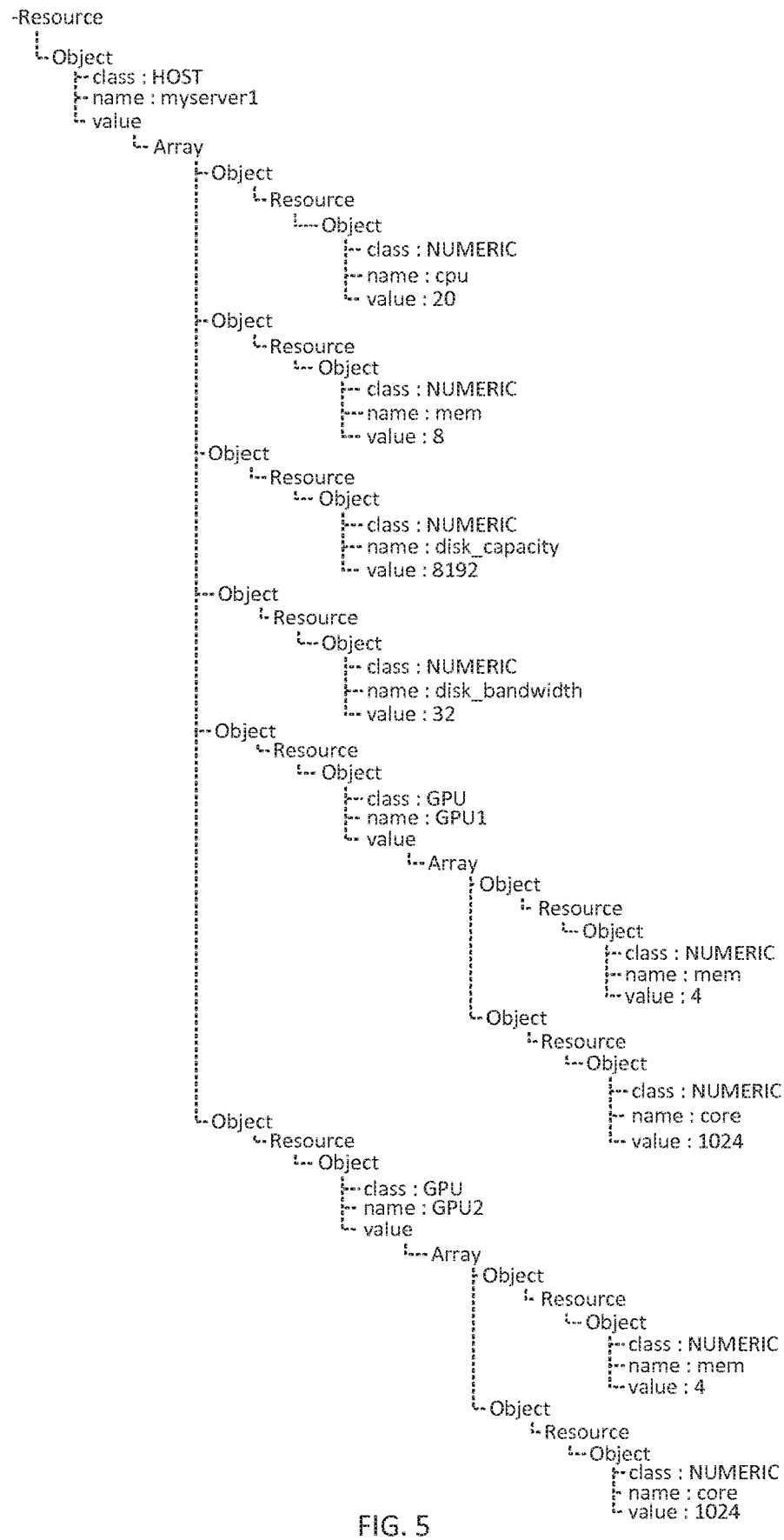

As illustrated in FIG. 5, the two sets of CPU cores have been defined as a single resource 150 having a NUMERIC class, a "cpu" name identifier, and a value of 20 corresponding to the total number of consumable cores. The two 4 GB memory modules have been similarly combined into a single 4 GB resource definition (i.e., a NUMERIC "mem" having a value identifier of 8).

In contrast, the resources 150 designated as GPUs have not been combined, nor have their associated memories or cores. Each GPU corresponds to a different resource definition (i.e., a first composite resource named GPU1 and a second composite resource named GPU2).

Whether the DRM groups similar resources 150 into a single resource definition or multiple resource definitions can depend on the how they are consumed. For example, the CPU cores and CPU memories may be accessed, shared, divided, or otherwise consumed by any number of workloads without any structural restriction. However, the GPU cores and memory may be physically or logically tied to their respective GPUs and/or physically or logically separate from the cores/memory of other GPUs, as a result of which they may not be readily shared or allocated across GPUs.

In some examples, the DRM may be configured to determine whether to group or otherwise manage similar resource types as a single resource or as separate resources based on resource information obtained for modelling the resources 150. In some instances, the resource information itself may define whether to group or otherwise manage similar resource types as a single resource.

FIG. 6 illustrates how the compute server (host) 400 in FIG. 4 can be defined as a composite resource 320 in JSON (JavaScript Object Notation).

In some examples, the resource modelling/definitions described herein may encapsulate the relationships between resources which may, in some instances, simplify resource management or reduce improper or inefficient allocations of different resources for a single workload. In some examples, the resource modelling/definitions described herein may allow for the modelling of many different types of resources 150 including networking devices, application licenses, power sources, FPGA (field programmable gate array) components, or any other known or future resource type. In some examples, composite resource modelling may simplify the addition of new resource types, complex resources, different resource topologies/relationships, etc.

The examples above are based on the model framework in FIG. 3; however, other frameworks or structures suitable for associating a resource with a class as well as associated resources may be used.

Figure 7:
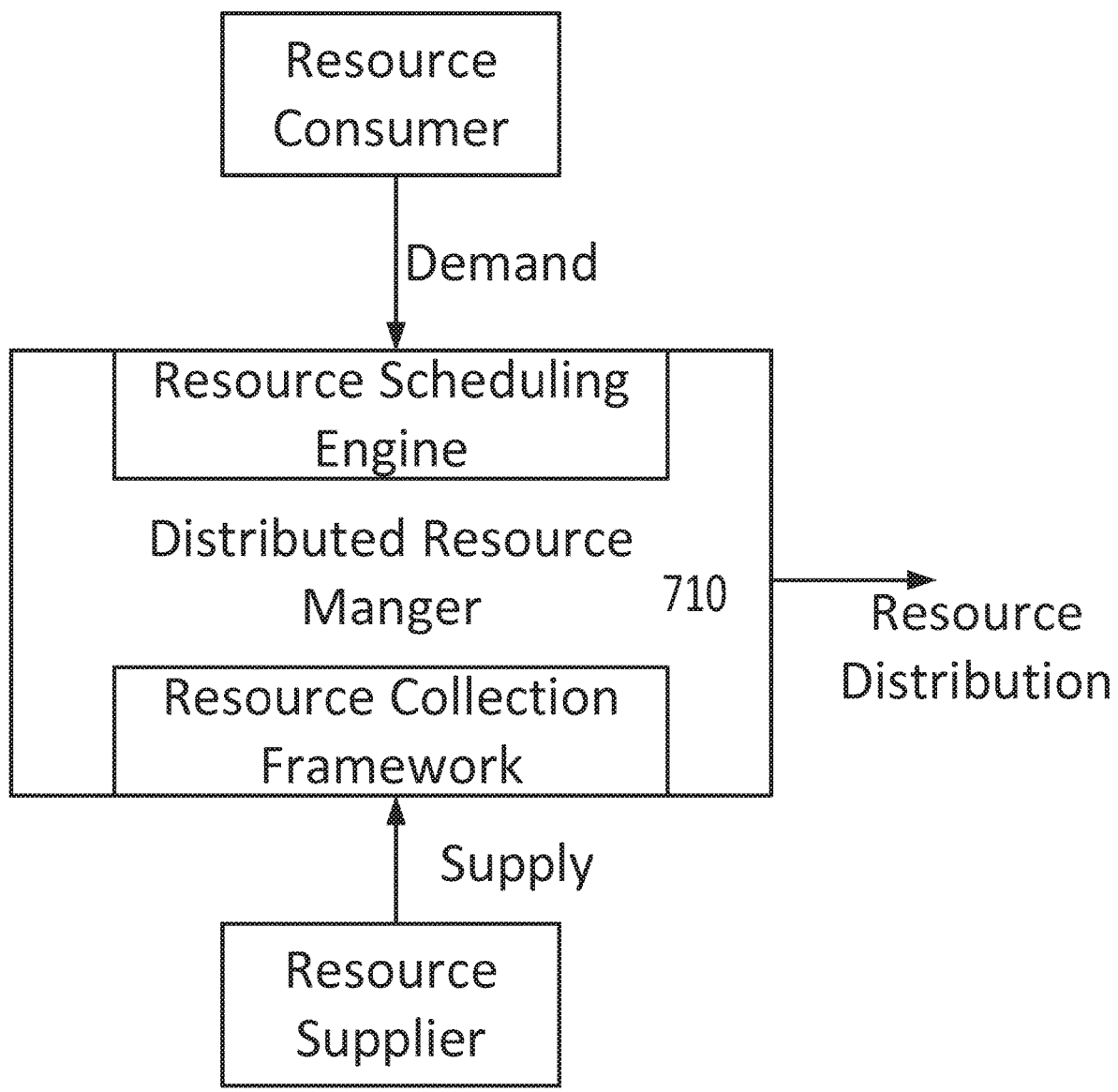
FIGS. 7 and 8 are diagrams showing aspects of example computing environments.

FIG. 7 shows aspects of an example computing environment 700 illustrating a framework for a distributed resource manager 710. The DRM can be configured to receive or otherwise obtain resource information and to receive demands or requests for resources. In some embodiments, the obtained resource information may provide the information required to generate or otherwise model the resource suppliers.

The DRM can be configured to store or have access to one or more resource models corresponding to with one or more resources 150 in the DRM system. The DRM can create or obtain the resource models from information regarding the one or more resources.

Received resource demands may be basic requests for basic resources, but, in some instances, may also include more complicated requests or preferences for resources having different relationships or attributes encapsulated by the models described herein.

With these inputs, the DRM can be configured to output a distribution or otherwise manage the allocation and/or scheduling of the resources to the workloads.

Figure 8:
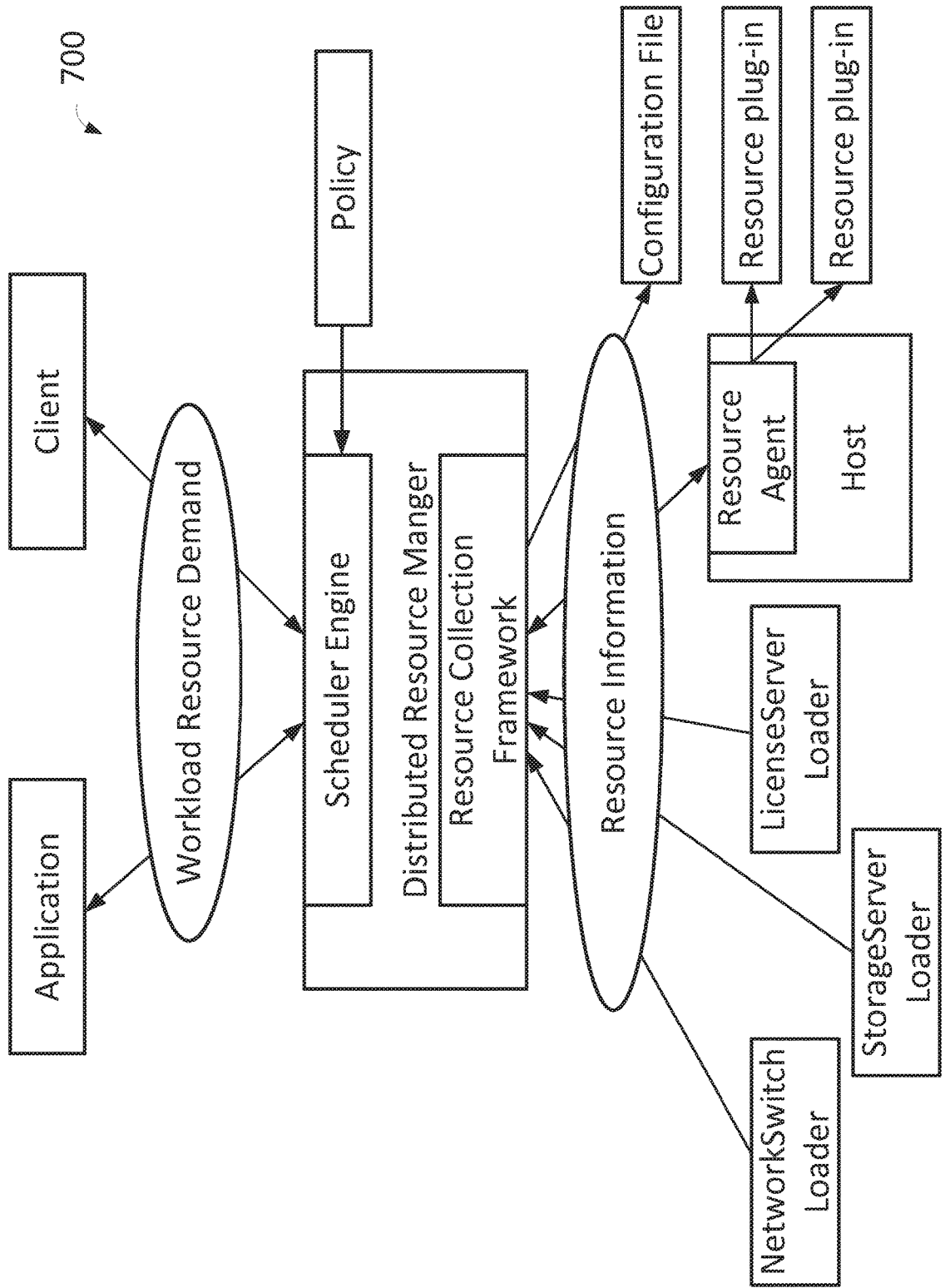

FIG. 8 shows aspects of an example computing environment 700 illustrating different examples of DRM interactions which may occur in different embodiments.

The DRM system can be configured to receive or otherwise obtain resource information. This resource information can include static and/or runtime/dynamic resource information. In some examples, the resource information may include resource types, resource names, device identifiers, network addresses, resource capacities or capabilities, consumed/available resource information, resource relationships, topologies, and/or any other information associated with one or more resources.

In some embodiments, agents 202, master 201, or other DRM components at various devices in the system can be configured to collect static and/or runtime/dynamic resource information. The DRM components can be configured to transmit, communicate or otherwise make this information available to the distributed resource manager. In some examples, the DRM components can send the information to another component in the DRM system, a storage device, database or other storage location in the DRM system which is accessible by the DRM components. In some examples, the agents 202 can be configured to utilize plug-ins to collect resource information.

In some embodiments, the DRM system may be configured to obtain resource information from one or more configuration files. In some embodiments, there may be a single or multiple centralized configuration files including information defining the managed resources in the system. In some embodiments, the agents 202, master 201, and/or other DRM components may be configured to upload resource information to the configuration files.

In some embodiments, the DRM system may be configured to obtain resource information from one or more loaders. For example, in some instances, some devices may not have any agent or other DRM component deployed locally (e.g., a network switch). One or more loaders can be configured to collect static information and/or runtime/dynamic information from one or more resources 150 and send or otherwise make the resource information available to the DRM system.

Any one or any combination of the above-mentioned or other approaches suitable for obtaining resource information may be used. The approaches used in the DRM system may depend on the types of devices and/or resources in the computing environment.

The DRM system can be configured to manage resource requests. For example, when a workload is submitted, a client device 120 or application can submit a request including a class and quantity of a resource required to run the workload.

In some embodiments, a resource request can include a required consumable resource identifier. A resource request may optionally include parameters for filtering or selecting the requested resource. In some examples, a resource request may optionally include parameters indicating non-essential preferences for a requested resource. In some examples, the requests may include ranges for value parameters, specific resource names, or parameters for basic resources, composite resources, and/or associated resources.

The following table provides examples of different resource requests for a DRM system with composite resource models. These examples are non-exhaustive, and in other embodiments may have different request structures or language.

| Request | Case description |
| --- | --- |
| Demand (host=1) | Requesting exclusive use of any available host |
| Demand (host.mem=1) | Requesting 1G memory from one host |
| Demand (host.mem=1) | Requesting 1G memory from one host |

| Request | Case description |
| --- | --- |
| Select (host.mem>4) | with 4G+ memory |
| Demand (host.gpu=1) | Requesting one GPU from any host exclusively used |
| Demand (host.gpu.memory=1) | Requesting 1G memory and the shared usage of one GPU |
| Demand (host.mem=1 && host.gpu=1) | Requesting 1G memory and one GPU The Host must have 4G+ memory |
| Select (host.mem>4) Prefer (host.gpu.name=GPU2) | And prefer the GPU with name GPU2 |
| Demand (switch.port=2) | Requesting two ports from one switch |

In some embodiments, the DRM system can be configured to assume default resource types when not explicitly included in a request. In some examples, this may simplify system design or improve usability. For example, because a commonly used resource in the above examples is "host", the system may be configured to have "host" be a default parent resource for "mem" and "gpu" resources. Requests could then be simplified, for example as:

| | |
| --- | --- |
| Demand (mem=1 && gpu=1) | Requesting 1G memory and one GPU |
| Select (mem>4) | The Host must have 4G+ memory |
| Prefer (gpu.name=GPU2) | And prefer the GPU with name GPU2 |

Upon receipt of a request, the DRM system can be configured to determine the availability of the requested resources 150, and schedule the workload associated with the request when the requested resources 150 are available.

In some examples, scheduling of workloads/resources can involve distributing modelled resources between workload resource requests. When the DRM system is configured to utilize the generic resource models described herein, all resources can potentially be modelled in the same way. Therefore, in some instances, a DRM policy designed for a particular resource 150 can be easily integrated to support other resource types.

For example, a fairshare policy may attempt to distribute a resource 150 fairly between different users. If the policy has been designed/implemented for a host (composite resource) and host.mem (numeric resource), the DRM system can be configured to extend support to GPUs (composite resource), GPU memory (numeric resource) or switch port (numeric resource) by extending the resource collection framework and policy configurations to the new resources 150. A developer would not need to change or rewrite the entire scheduling engine or policy to handle these new resource types.

Figure 9:
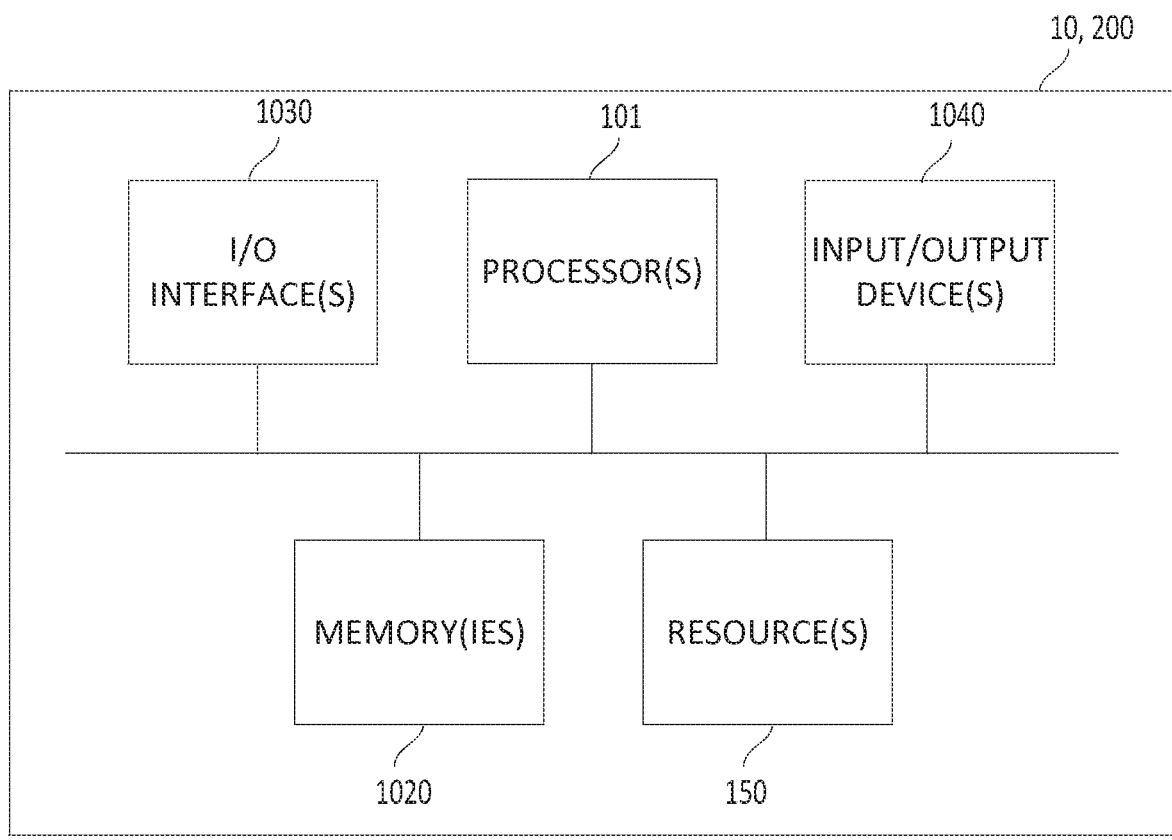
FIG. 9 is a diagram showing aspects of an example system or device.

FIG. 9 shows a schematic diagram of an example system 10 or example devices 200 for managing resources 150.

In some embodiments, the systems 10 or devices 200 may include one or more processors 101, memory devices 1020, input/output interfaces 1030, input devices 1040, resources 150 and/or any other devices 200 or mechanisms suitable for or involved in performing aspects of the methods and functions described herein.

In some embodiments, the system 10 may include one or more devices 200 or systems which provide the mechanisms, controls, devices and/or communication links to perform aspects of the methods and functions described herein. For example, the system 10 may include one or more computers, servers, and control devices configured for running workloads or for accessing, controlling, monitoring or otherwise utilizing resources 150. In some embodiments, an example device 200 or system 10 may be a standalone computer, server, mobile device, mainframe, supercomputer, computing array or other computing device or devices configured for executing workloads and/or managing resources.

In some embodiments, a resource 150 may be specific to a particular device and may only be utilized by workloads on that device 200. Some resources 150 may be shared resources 150 which can be accessed and/or utilized by workloads executing on different devices. Resources 150 may be elastic or non-elastic. Elastic resources may be resources 150 which a workload may utilize in a time-sharing fashion or will not hold for its entire life cycle. Examples of elastic resources include CPU cycles and network bandwidth.

Non-elastic resources may include resources 150 which once allocated to a workload cannot be shared or used by other workloads unless the first workload completes or proactively releases the resource 150. Examples of non-elastic resources include volatile memory, storage device space, swap space, and software licenses.

The resources 150 may be accessed, monitored, or utilized via one or more connections such as internal busses or signal lines, or via a communication interface and/or network.

Each processor 101 may be, for example, any type of general-purpose microprocessor or microcontroller, a central or graphics processing unit, a digital signal processing (DSP) processor, an integrated circuit, a field programmable gate array (FPGA), a reconfigurable processor, a programmable read-only memory (PROM), or any combination thereof.

Memory or storage devices 1020 may include one or a combination of any type of computer memory that is located either internally or externally (e.g., networked or peripheral), for example, hard drives, flash memory, solid state memory, network storage devices, random-access memory (RAM), cache memory, read-only memory (ROM), Blu-ray® or compact disc read-only memory (CDROM), electro-optical memory, magneto-optical memory, erasable programmable read-only memory (EPROM), and electrically-erasable programmable read-only memory (EEPROM), Ferroelectric RAM (FRAM), non-transitory computer readable media or the like. The memory(ies) and storage provided by these devices may be resources managed by the system 10.

In some examples, memory devices 1020 may include data or instruction sets for implementing, controlling or instructing DRM components, workloads and/or resources. The memory devices 1020 may also include instructions or code for configuring one or more processors and other components of the device 200 or system 10 to perform any of the methods and functions described herein.

Some input/output (I/O) interfaces 1030 can enable a device 200 or system 10 to interconnect with one or more input devices, such as a keyboard, mouse, camera, touch screen and a microphone, or with one or more output devices such as a display screen or a speaker. In some embodiments, I/O interfaces 1030 can also include network interfaces which enable devices 200 or aspects of the system 10 to communicate with other components (such as other devices, DRM components or resources), to exchange data with other components, to access and connect to network resources, to serve applications, and to perform other computing applications by connecting to one or more wired or wireless networks capable of carrying data including the Internet, Ethernet, plain old telephone service (POTS) line, public switched telephone network (PSTN), integrated services digital network (ISDN), digital subscriber line (DSL), coaxial cable, fiber optics, satellite, mobile, wireless (e.g., Wi-Fi, WiMAX), SS7 signaling network, Bluetooth™, near field communication (NFC), fixed line, local area network, wide area network, busses and others, including any combination of these.

In some examples, one or more I/O interfaces 1030 may enable a device 200 or system 10 to communicate, instruct, control, monitor or otherwise interconnect with a resource 150 or another device or system.

In some embodiments, devices 200 and/or systems 10 may include input or output devices such as keyboard, mouse, camera, touch screen, microphone, displays, etc. For example, a computing device or printing device may include a keypad, touchscreen, or other integrated, peripheral or linked input or output device. The input devices may be configured to receive instructions to run workloads or to change DRM settings. The output devices may be configured to display or otherwise output workload results, workload statuses, resource information, etc.

Figure 10:
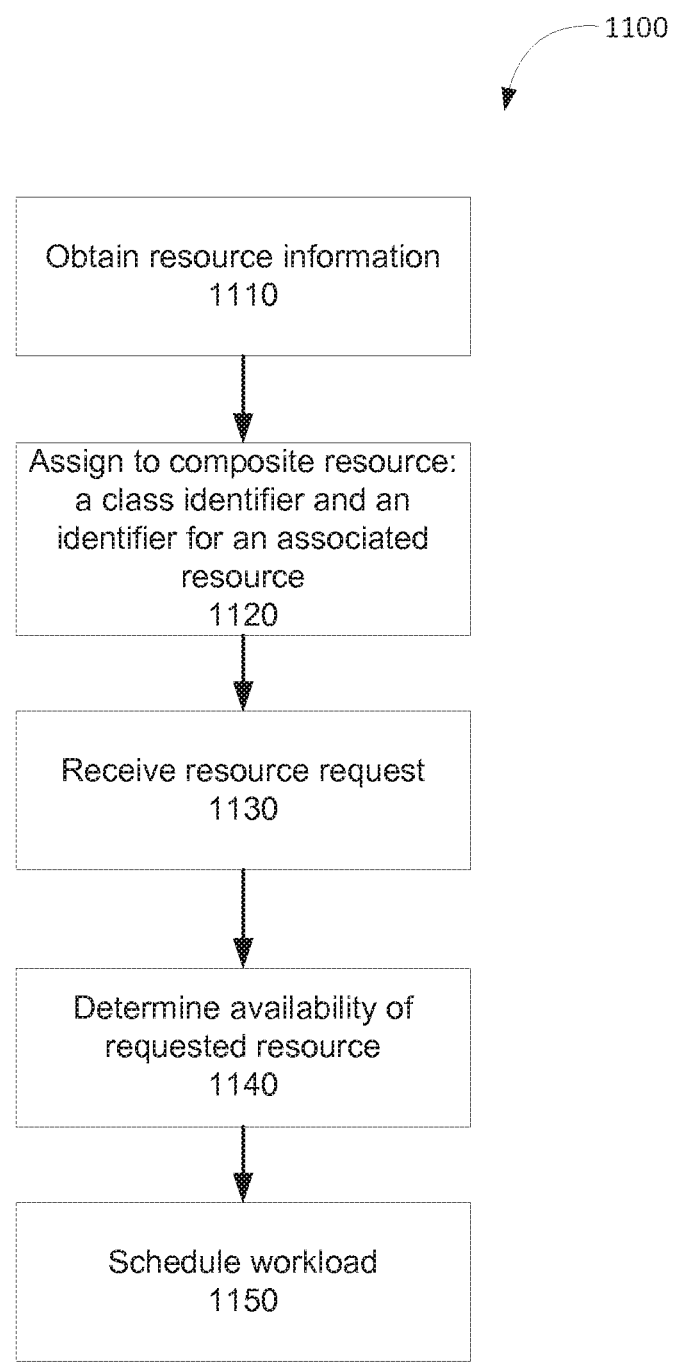
FIG. 10 is a flowchart showing aspects of an example method.

FIG. 10 is a flowchart showing aspects of an example method for managing resources in a distributed resource management system.

At 1110, one or more processors 101 in the DRM system obtain resource information. In some embodiments, the resource information can include information for collecting, classifying, encapsulate, defining or otherwise modelling DRM resources for management by the DRM system. In some embodiments, the resource information can include resource types, names, capacities/capabilities, and any other information relevant to DRM management.

In some embodiments, obtaining resource information can include obtaining or monitoring resource utilization/availability. In some examples, utilization information can include, for example, a total amount of the resource being used, a total percentage of the resource being used, an amount of available resource, etc. In some embodiments, resource utilization information may be periodically or continuously obtained.

As described herein or otherwise, in some embodiments, resource information can be collected by DRM agents or other DRM components which may store or communicate the resource information to a DRM master or other DRM components. In some embodiments, the resource information may be obtained from one or more configuration files. In some embodiments, the resource information may be obtained from a loader.

At 1120, based on the obtained resource information, the processors 101 assign to a composite resource 320 to be managed: a class identifier, and an identifier for at least one associated resource.

In some examples, assigning identifiers to the composite resource 320 can include generating a definition or model for associating with the composite resource 320. The definition or model can include the class identifier and one or more associated resource identifiers.

The class identifier can be any value (e.g., alphanumeric string, number, pointer, etc.) from which the DRM system can identify a resource class to which the composite resource 320 belongs.

In some embodiments, the identifier for an associated reference can include a class, name, pointer, resource definition/model or any other data suitable for identifying or otherwise indicating an association with another resource 150.

With reference to FIG. 4, the resource information for the example host resource 400 can be obtained by the processors 101. With this information, the processors 101 can be configured to create a model or definition for assigning to the host resource. This model/definition as illustrated, by way of example, in FIG. 5 assigns to the host resource 400: a class identifier of "host" and identifiers for the additional resources associated with the host, namely the "cpu" resources, the "mem" resources, the "disk_capacity" resource, the "disk_bandwidth" resource, and the two composite GPU resources.

These identified composite GPU resources are assigned to their own class identifier (i.e., the GPU class) and associated resource identifiers (e.g., mem and core resources).

In some embodiments, the processors 101 can assign, to the composite resource 320, a name identifier for assigning a particular name or otherwise providing another field for identifying the resource 150.

In some embodiments, the processors 101 can assign, to the composite resource 320, a value attribute for quantifying or otherwise identifying the capacity or capability of the resource 150. For example, the composite resource 320 may have assigned a model, attribute or other data indicating that the composite resource 320 includes or is associated with an array or number of associated resources 150.

At 1130, the processors 101 receive a resource request. The resource request can be received from a client device/process, an application, or any other source. In some examples, the resource request may be part of a request to handle one or more workloads. As illustrated by the examples described herein, the resource request can include a request for a resource class (e.g., host) and an associated additional resource class (e.g., host.cpu).

In some examples, the resource request can include parameters (e.g., class, name, value) which may be required or preferred. In some examples, the resource request can include an indication of whether the resource 150 is to be used exclusively by the requesting workload (e.g., a quantity of memory) or can be shared with other workloads (e.g., a number of cores). In some examples, the DRM system can be configured such that only certain classes of resources 150 may be shared or exclusively allocated.

In some examples, a resource request can include a name identifier indicating that a workload requires or prefers a resource 150 having a particular name.

At 1140, processors 101 determine the availability of the request resources 150 in the resource request. In some examples, this determination may be dependent on obtained, monitored, or otherwise managed resource information which indicates current utilizations/availabilities for the resources 150.

At 1150, processors 101 can be configured to schedule a workload 1150 when the requested resources 150 are available or otherwise based on the determination at 1140. In some examples, this can include reserving or allocating the requested resources 150, updating resource information to indicate the resource allocation/reservation and/or generating signals to launch the workload on the allocated resources 150.

In some instances, the systems, devices, methods and computer-readable media provided herein may provide a resource modelling which identifies resource classes, quantities and relationships between resources. In some examples, this may enable a DRM system to use the same policy for different resources with minimal or no code change. In some examples, encompassing resource relationships may also improve or simplify resource scheduling policies (e.g., fine scheduling) and management.

Embodiments disclosed herein may be implemented using hardware, software or some combination thereof. Based on such understandings, the technical solution may be embodied in the form of a software product. The software product may be stored in a non-volatile or non-transitory storage medium, which can be, for example, a compact disk read-only memory (CD-ROM), USB flash disk, a removable hard disk, flash memory, hard drive, or the like. The software product includes a number of instructions that enable a computing device (computer, server, mainframe, or network device) to execute the methods provided herein.

Program code may be applied to input data to perform the functions described herein and to generate output information. The output information is applied to one or more output devices. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and/or combination thereof.

Each computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

The present disclosure may make numerous references to servers, services, interfaces, portals, platforms, or other systems formed from hardware devices. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

Various example embodiments are described herein. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory(ies), displays, networks particularly configured to implement various acts. The embodiments described herein are directed to electronic machines adapted for processing and transforming electromagnetic signals which represent various types of information. The embodiments described herein pervasively and integrally relate to machines and their uses; the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving, by a distributed resource manager of a computing system, a resource request for a workload, the resource request identifying a composite resource of the computing system, wherein the composite resource is a resource of the computing system that is associated with at least one other resource of the computing system, the at least one other resource associated with the composite resource including a first associated resource of a first resource type different from a resource type of the composite resource;

retrieving, by the distributed resource manager of the computing system, a resource model defining a first relationship between the composite resource and the first associated resource;

scheduling, by the distributed resource manager of the computing system, the workload for execution using the composite resource and the first associated resource by using a same scheduler to allocate the composite resource and the first associated resource based on the first relationship defined in the resource model and based on an availability of the composite resource and a corresponding availability of each of the at least one other resource associated with the composite resource, the scheduling comprising:

determining, by the distributed resource manager of the computing system, the availability of the composite resource and the at least one other resource associated with the composite resource by determining that the composite resource and the at least one other resource associated with the composite resource are not being used by another workload, and scheduling the workload for execution using the composite resource when the composite resource and the at least one other resource associated with the composite resource are determined to not be used by another workload; and updating, by the distributed resource manager of the computing system, the availability of the composite resource and the corresponding availability of the first associated resource.

2. The method of claim 1, wherein the composite resource includes a class identifier for identifying the resource type of the composite resource.

3. The method of claim 2, wherein the class identifier identifies the resource type of the composite resource as one of:
a boolean resource,
a numeric resource, or
a string resource.

4. The method of claim 2, wherein the class identifier identifies a second resource type of a second composite resource, wherein the second composite resource is a resource of the computing system that is different than the composite resource, and wherein the second composite resource is associated with a third resource of the computing system.

5. The method of claim 4, wherein the second composite resource is associated with a third composite resource for the workload, wherein the third composite resource is associated with at least one other resource of the computing system that are not associated with either the composite resource or the second composite resource.

6. The method of claim 1, wherein the composite resource includes a class identifier for identifying a class of the composite resource, wherein the class of the composite resource identifies the composite resource as being a consumable resource or a non-consumable resource.

7. The method of claim 1, wherein scheduling comprises:
scheduling the workload for execution using the composite resource based on a priority of the workload relative to priorities of each other scheduled workload.

8. The method of claim 1, further comprising:
before the receiving:
obtaining resource information of the computing system; and
generating the composite resource based on the resource information.

9. The method of claim 8, wherein generating the composite resource based on the resource information comprises assigning a class identifier to the composite resource and an additional identifier to each of the at least one other resource based on the resource information, the class identifier for identifying the resource type of the composite resource, and each respective additional identifier for identifying one of the at least one other resource associated with the composite resource.

10. The method of claim 1, the resource request further identifying at least one of:
one or more additional resources, or
one or more additional composite resources.

11. The method of claim 1,
wherein the at least one other resource associated with the composite resource further includes a second associated resource of a second resource type,
wherein the resource type of the composite resource is one of a boolean resource type, a numeric resource type, or a string resource type,
wherein the first resource type is one of the boolean resource type, the numeric resource type, or the string resource type,
wherein the second resource type is one of the boolean resource type, the numeric resource type, or the string resource type,
wherein the resource type of the composite resource, the first resource type, and the second resource type are different than one another, and
wherein the scheduling comprises:
scheduling, by the distributed resource manager of the computing system, the workload for execution using the composite resource based on the first relationship defined in the resource model, based on a second relationship between the composite resource and the second associated resource, and based on the availability of the composite resource, the first associated resource of the first resource type, and the second associated resource of the second resource type.

12. The method of claim 1, wherein the resource request further indicates whether the composite resource is to be used exclusively by the workload.

13. A computing system comprising:
at least one processor; and
a non-transitory computer readable storage medium storing programming for execution by the at least one processor, the programming including instructions to perform operations, the operations including:
receiving a resource request for a workload, the resource request identifying a composite resource of the computing system, wherein the composite resource is a resource of the computing system that is associated with at least one other resource of the computing system, the at least one other resource associated with the composite resource including a first associated resource of a first resource type different from a resource type of the composite resource;
retrieving a resource model defining a first relationship between the composite resource and the first associated resource;
scheduling the workload for execution using the composite resource and the first associated resource by using a same scheduler to allocate the composite resource and the first associated resource based on the first relationship defined in the resource model and based on an availability of the composite resource and a corresponding availability of each of the at least one other resource associated with the composite resource, the scheduling comprising:

determining the availability of the composite resource and the at least one other resource associated with the composite resource by determining that the composite resource and the at least one other resource associated with the composite resource are not being used by another workload, and scheduling the workload for execution using the composite resource when the composite resource and the at least one other resource associated with the composite resource are determined to not be used by another workload; and updating the availability of the composite resource and the corresponding availability of the first associated resource.

14. The computing system of claim 13, wherein the composite resource includes a class identifier for identifying the resource type of the composite resource.

15. The computing system of claim 14, wherein the class identifier identifies the resource type of the composite resource as one of:
    a boolean resource,
    a numeric resource, or
    a string resource.

16. The computing system of claim 14, wherein the class identifier identifies a second resource type of a second composite resource, and wherein the second composite resource is a different than the composite resource.

17. The computing system of claim 16, wherein the second composite resource is associated with a third composite resource for the workload, wherein the third composite resource is associated with at least one other resource of the computing system that are not associated with either the composite resource or the second composite resource.

18. A non-transitory computer-readable medium having instructions stored thereon that, when executed by a computing system, cause the computing system to perform operations, the operations comprising:

receiving a resource request for a workload, the resource request identifying a composite resource of the computing system, wherein the composite resource is a resource of the computing system that is associated with at least one other resource of the computing system, the at least one other resource associated with the composite resource including a first associated resource of a first resource type different from a resource type of the composite resource;

retrieving a resource model defining a first relationship between the composite resource and the first associated resource; and scheduling the workload for execution using the composite resource and the first associated resource by using a same scheduler to allocate the composite resource and the first associated resource based on the first relationship defined in the resource model and based on an availability of the composite resource and a corresponding availability of each of the at least one other resource associated with the composite resource, the scheduling comprising:

determining the availability of the composite resource and the at least one other resource associated with the composite resource by determining that the composite resource and the at least one other resource associated with the composite resource are not being used by another workload, and scheduling the workload for execution using the composite resource when the composite resource and the at least one other resource associated with the composite resource are determined to not be used by another workload; and updating the availability of the composite resource and the corresponding availability of the first associated resource.

19. The non-transitory computer-readable medium of claim 18, wherein the composite resource includes a class identifier for identifying the resource type of the composite resource.

20. The non-transitory computer-readable medium of claim 19, wherein the class identifier identifies the resource type of the composite resource as one of:
    a boolean resource,
    a numeric resource, or
    a string resource.

21. The non-transitory computer-readable medium of claim 19, wherein the class identifier identifies a second resource type of a second composite resource, and wherein the second composite resource is a different than the composite resource.

\* \* \* \* \*